Nov. 17, 1936.  J. E. SNYDER  2,060,906
UNITING MATERIALS
Filed March 16, 1932
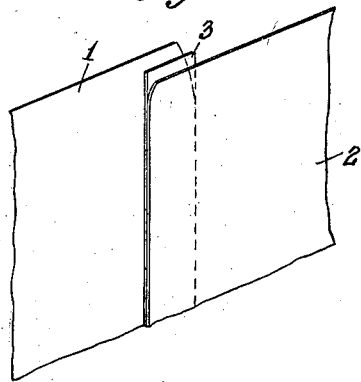
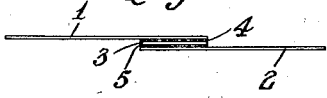

Patented Nov. 17, 1936

2,060,906

UNITED STATES PATENT OFFICE 2,060,906

UNITING MATERIALS

James E. Snyder, Kenmore, N. Y., assignor, by mesne assignments, to E. I. du Pont de Nemours & Company, Wilmington, Del., a corporation of Delaware Application March 16, 1932, Serial No. 599,093

12 Claims. (Cl. 154—42)

This invention relates to uniting materials, and more particularly to uniting materials by means of tape provided with thermo-active adhesives.

In the manufacture and use of various web materials, such as wrapping tissues, in which class may be included sheets or films of regenerated cellulose, either plain, coated or moistureproofed, it is common for the web or film to break due to various reasons. It is desirable to expeditiously mend or splice these breaks in a simple and convenient manner, without deleteriously affecting the web in so far as its physical characteristics are concerned, so the mended web can be used in its ordinary way. Also, it is often desirable to join or splice together the ends of small rolls of web materials. In the case of uncoated regenerated cellulose films, the use of water-containing adhesives for making splices results in the spliced portion becoming buckled or wrinkled, thus producing an unsightly thickened splice which does not properly pass through the various machines used for finishing the web material and machines used for applying the web to materials, such as in wrapping packages. In the case of sheets or films of regenerated cellulose coated with a lacquer, for example, a cellulose derivative lacquer or a moistureproofing composition comprising a cellulose derivative and a wax with or without a gum or resin, and optionally a plasticizer, the ordinary water-energized adhesives do not make a satisfactory joint, in fact such adhesives do not adhere to the aforementioned materials.

I have found that the above-mentioned difficulties can be overcome by splicing together the adjoining ends of the materials with suitable adhesives which are substantially free from water, which adhesives are normally non-tacky and are temporarily rendered tacky or adhesive by the application of heat.

It is, therefore, an object of this invention to unite or splice together the adjoining ends of materials by means of thermo-active adhesives so as to produce a thin, smooth splice substantially free from buckling.

A further object of this invention is to provide a splicing strip or tape with suitable thermo-active adhesive whereby smooth, effective splices can be quickly made.

The above and other objects will appear from the following description, appended claims and accompanying drawing forming a part of this specification and in which:

Figure 1 is a perspective view of a preferred form of the invention in which a partly completed spliced joint is shown as formed by means of a splicing tape.

Figure 2 is a cross-section of the spliced joint illustrated in Figure 1, with the thickness of the parts exaggerated for clearness.

In the drawing, reference numerals 1 and 2 indicate sheets of material which are to be joined or spliced together. They are arranged in overlapping relation as shown with a splicing strip or tape 3 placed therebetween. The splicing tape 3 has coatings 4 and 5 of suitable thermo-active adhesive upon its opposite sides. In making the splice, the parts may be placed in the position shown in Figure 2 and suitable heat and pressure applied to one or both of the sheets 1, 2 in the region of the tape 3 so as to render the adhesive coatings 4 and 5 tacky, whereupon they adhere to the sheets 1 and 2 to produce the spliced joint. After the adhesive cools to normal temperature, it sets to its previous strong, non-tacky condition. This tape may also be used for sealing wrappers by slipping it between two contacting ends or sides of the wrapper and applying heat.

It will be appreciated that the splicing tape may be coated with thermo-active adhesive upon one side instead of on both sides and used for the purpose of making a spliced joint in any suitable way, as, for example, by sealing it over the abutting ends of two sheets of material. Such a tape coated on one side may also be used in any desired way for the sealing of packages and for mending torn pages of books. Also, labels coated on one side with suitable thermo-active adhesives may be attached to sheets or packages wrapped with such sheets.

The base of the splicing tape may be made of any suitable material. Where one or both of the sheets to be united are transparent, as in the case of regenerated cellulose materials, it is desirable that the spliced joint shall also be transparent. Under such circumstances, the base of the splicing tape is preferably made of transparent material, such as regenerated cellulose or other suitable transparent material, and is preferably coated with the thermo-active adhesive which is substantially transparent. Where the sheets to be spliced are colored or opaque, the adhesive to be used, or the base of the tape, or both, are preferably made of the same color as the sheets to be joined. The tape base and/or the adhesive may, however, be made of a different color from the sheets to be joined so as to act as a decoration.

While any suitable thermo-active adhesive can be used for the carrying out of this invention, several preferred examples are hereinafter set forth of adhesives which have given very satisfactory results. When used for joining transparent sheets or films, the adhesives given in these examples are sufficiently transparent to result in the production of a substantially transparent spliced joint.

The splicing tape may be made in any desired way and of any suitable material. The material constituting the base of the tape, for example, a sheet of regenerated cellulose of either the coated or uncoated variety, may have one or both sides coated with a suitable adhesive depending on whether it is desired to attach one or both sides of the tape to other materials. The adhesive may be deposited upon the base sheet from solution or otherwise in any well known way. Any excess thickness of coating is removed in a well known way. The coated sheet is then dried, after which it is slit into suitably narrow widths and wound into rolls, or, if desired, the tape base may first be cut to the desired tape width and then have the adhesive applied thereto.

The following examples of thermo-active adhesives will be described as applied to sheets or films of regenerated cellulose whether coated or not, and in terms of a transparent splicing tape. It is to be understood that these examples are illustrative and not limitative of the invention.

Example I

A sheet of regenerated cellulose is coated on both sides with balata deposited from a 20% solution of corrugated sheet balata in benzene. After coating, the film is dried and set by festooning in the air for a period of about two days. It is then slit into suitably narrow widths and wound.

The splicing tape so produced is transparent, colorless and non-tacky, and is capable of becoming tacky by a short exposure at an elevated temperature such as 90° C.

To effect a joint or seal between two sheets of material, such as regenerated cellulose, the splicing tape above described is inserted between the two sheets and the joint pressed with a warm iron. Finally the joint is suitably trimmed.

Example II

A sheet or web of regenerated cellulose is coated on both sides with a solution of:

|  | Parts by weight |
|---|---|
| "Mowilith N" | 96 |
| Ethyl phthalate | 16 |
| Benzene | 237 |

"Mowilith N" is the trade name of a polymerized vinyl resin having the following characteristics:

| | |
|---|---|
| Specific gravity (ASTM D-152-27) | 1.17 at 25° C. |
| Viscosity (200% reduction toluol) | Gardner-Holt tubes H at 25° C. |
| Color {Gardner-Holt tubes, 200% reduction toluol} | #2 |
| Refractive index (200% reduction toluol) | 1.4872 at 25° C. |
| Melting point | 1.02° C. |
| Acid number | 2.5 |

The coating is done at room temperature, the excess being removed by means of doctor knives. The coated web is dried by passing through a heated tower and immediately wound into a roll. It is then slit to produce rolls of suitable width. The thickness of the coated sheet may be about 0.00225 inch, the adhesive on each side being about 0.000665 inch. The splicing tape is used as set forth under Example I.

Example III

As set forth in Example I, a sheet or film of regenerated cellulose is coated on both sides with a solution of the following:

|  | Parts |
|---|---|
| Alkyd resin A | 55 |
| Alkyd resin B | 45 |
| Acetone | 100 |

Alkyd resin A is the reaction product of:

|  | Parts |
|---|---|
| Ethylene glycol | 30 |
| Phthalic anhydride | 70 | when heated in an open vessel for 3 hours at 180° C. followed by 9 hours heating at 2. ° C. to yield a product possessing a final acid number of 18–20.

Alkyd resin B is the reaction product of:

|  | Parts |
|---|---|
| Ethylene glycol | 26 |
| Phthalic anhydride | 51 |
| Castor oil | 23 | when heated in a closed vessel under reflux for 1 hour at 200° C. and then without reflux for 4 hours at 225° C. when a product of acid number 7–8 is obtained.

The excess coating is removed by means of doctor blades and the film is dried and set by festooning in the air for about two days. The film is then slit into suitable widths and wound into rolls.

The so prepared splicing tape is reasonably colorless and transparent, but slightly tacky. It is used as described above. In winding the slit rolls, I prefer to interweave a web of wax paper or moistureproof regenerated cellulose sheeting and to wind loosely to prevent sticking. Loose winding and storing in a cool place is desirable in all cases.

The invention may be embodied in other specific forms without departing from the spirit or essential characteristics of the invention, and the present embodiment is therefore to be considered in all respects as illustrative and not restrictive, the scope of the invention being indicated by the appended claims rather than by the foregoing description, and all changes which come within the range of equivalents of the claims are therefore intended to be embraced therein.

I claim:

1. A transparent spliced joint comprising overlapped portions of two oppositely extending transparent regenerated cellulose sheets adhesively secured by a transparent splicing tape interposed between said overlapped portions, said splicing tape comprising a transparent strip having a coating of transparent normally substantially non-tacky adhesive which becomes tacky when heated.

2. A transparent spliced joint comprising overlapped portions of two oppositely extending transparent regenerated cellulose sheets adhesively secured by a transparent splicing tape interposed between said overlapped portions, said splicing tape comprising a transparent strip of regenerated cellulose having a coating of transparent normally substantially non-tacky adhesive on its opposite sides which becomes tacky when heated.

3. A transparent spliced joint comprising overlapped portions of two oppositely extending transparent regenerated cellulose sheets adhesively secured by a transparent splicing tape interposed between said overlapped portions, said splicing tape comprising a transparent strip of regenerated cellulose having a coating of transparent, normally substantially non-tacky adhesive which becomes tacky when heated.

4. A transparent spliced joint comprising overlapped portions of two oppositely extending transparent regenerated cellulose sheets adhesively secured by a transparent splicing tape interposed between said overlapped portions, said splicing tape comprising a strip of regenerated cellulose having a coating of transparent normally substantially non-tacky adhesive comprising balata as an essential constituent, which adhesive becomes tacky when heated.

5. A transparent spliced joint comprising overlapped portions of two oppositely extending transparent regenerated cellulose sheets adhesively secured by a transparent splicing tape interposed between said overlapped portions, said splicing tape comprising a transparent strip of regenerated cellulose having a coating of transparent normally substantially non-tacky adhesive comprising a polymerized vinyl resin whose melting point is approximately 102° C. as an essential constituent, which adhesive becomes tacky when heated.

6. A transparent spliced joint comprising overlapped portions of two oppositely extending transparent regenerated cellulose sheets adhesively secured by a transparent splicing tape interposed between said overlapped portions, said splicing tape comprising a transparent strip of regenerated cellulose having a coating of transparent normally substantially non-tacky adhesive comprising as essential constituents, an alkyd resin whose acid number is approximately 18 to 20 and an alkyd resin whose acid number is approximately 7 to 8, which adhesive becomes tacky when heated.

7. The method of splicing adjacent ends of two oppositely extending transparent sheets of regenerated cellulose together comprising applying to the sheets a transparent strip coated with transparent, normally substantially non-tacky adhesive which becomes tacky when heated, and applying heat to splice said ends and produce a transparent joint.

8. The method of splicing adjacent ends of two oppositely extending transparent sheets of regenerated cellulose together comprising applying to the sheets a transparent strip of regenerated cellulose coated with transparent, normally substantially non-tacky adhesive which becomes tacky when heated, and applying heat to splice said ends and produce a transparent joint.

9. The method of splicing adjacent ends of two oppositely extending transparent sheets of regenerated cellulose comprising interposing between the sheets a transparent strip having its opposite sides coated with transparent, normally substantially non-tacky adhesive which becomes tacky when heated, and applying heat to splice said ends and produce a transparent joint.

10. The method of splicing adjacent ends of two oppositely extending transparent sheets of regenerated cellulose comprising applying to the sheets a transparent strip of regenerated cellulose coated with transparent, normally substantially non-tacky adhesive comprising balata as an essential ingredient, which adhesive becomes tacky when heated, and applying heat to splice said ends and produce a transparent joint.

11. The method of splicing adjacent ends of two oppositely extending transparent sheets of regenerated cellulose comprising applying to the sheets a transparent strip of regenerated cellulose coated with transparent, normally substantially non-tacky adhesive comprising a polymerized vinyl resin whose melting point is approximately 102° C. as an essential ingredient, which adhesive becomes tacky when heated, and applying heat to splice said ends and produce a transparent joint.

12. The method of splicing adjacent ends of two oppositely extending transparent sheets of regenerated cellulose comprising applying to the sheets a transparent strip of regenerated cellulose coated with transparent adhesive comprising an alkyd resin whose acid number is approximately 18 to 20 and an alkyd resin whose acid number is approximately 7 to 8 as essential ingredients, which adhesive becomes tacky when heated, and applying heat to splice said ends and produce a transparent joint.

JAMES E. SNYDER.